(12) United States Patent  (10) Patent No.: US 7,877,021 B2
Jolly  (45) Date of Patent: Jan. 25, 2011

(54) ELECTRICALLY PROGRAMMABLE PULSE GENERATOR, IN PARTICULAR A PULSE GENERATOR OF VERY HIGH RESOLUTION PHASE AND INTENSITY PROFILES

(75) Inventor: Alain Jolly, Andernos (FR)

(73) Assignee: Commissariat a l'Energie Atomique, Paris (FR)

( * ) Notice: Subject to any disclaimer, the term of this patent is extended or adjusted under 35 U.S.C. 154(b) by 522 days.

(21) Appl. No.: 11/659,895

(22) PCT Filed: Aug. 9, 2005

(86) PCT No.: PCT/FR2005/050662

§ 371 (c)(1),
(2), (4) Date: Jan. 22, 2008

(87) PCT Pub. No.: WO2006/018589

PCT Pub. Date: Feb. 23, 2006

(65) Prior Publication Data

US 2008/0253775 A1  Oct. 16, 2008

(30) Foreign Application Priority Data

Aug. 10, 2004 (FR) .................................. 04 51834

(51) Int. Cl.
H04B 10/04 (2006.01)
(52) U.S. Cl. .................. 398/201; 398/182; 398/183; 372/25; 372/30; 385/3; 385/15; 385/27; 359/237; 359/326; 359/245
(58) Field of Classification Search .................. 398/201, 398/182, 80, 179, 82, 84, 87, 183, 185, 186, 398/188, 192, 200, 158, 180, 175, 176; 372/6, 372/30, 18, 25, 38; 385/1, 2, 3, 15, 27, 24, 385/39, 122; 359/245, 237, 238, 332, 326, 359/278
See application file for complete search history.

(56) References Cited

U.S. PATENT DOCUMENTS 5,136,532 A * 8/1992 Lefevre ...................... 708/801

(Continued)

FOREIGN PATENT DOCUMENTS

EP  1349311 A1  10/2003

(Continued)

OTHER PUBLICATIONS

International Search Report, PCT/FR2005/050662, 2 pgs., (Jan. 20, 2006).

(Continued)

*Primary Examiner*—Hanh Phan
(74) *Attorney, Agent, or Firm*—Nixon Peabody LLP (57) ABSTRACT

In a pulse generator of very high resolution phase and/or intensity profiles, an active mode-locking laser source (1) emits a first train of optical pulses according to a determined period (To), which is intensity-modulated pulse-by-pulse by a modulator (2). The modulated pulses are transmitted to an optical loop (3) via a coupler (4). The optical length of the optical loop is slightly different from the period (To) of the source. The modulated pulses are transmitted to input B of the coupler. The optical loop connects output D to input A of the coupler. This coupler is commanded such that, according to a first command (k=0), it transmits the light received on its two inputs A, B towards output d, and according to a second command (K=1), it transmits the light received on its input (A) towards output (C).

13 Claims, 3 Drawing Sheets

U.S. PATENT DOCUMENTS

| | | | |
|---|---|---|---|
| 5,557,401 A * | 9/1996 | Maeda et al. | 356/73.1 |
| 6,504,969 B1 * | 1/2003 | Tsao et al. | 385/24 |
| 6,724,783 B2 * | 4/2004 | Jalali et al. | 372/9 |
| 6,987,904 B2 * | 1/2006 | Kawanishi et al. | 385/27 |
| 2002/0037135 A1 * | 3/2002 | Atieh et al. | 385/37 |
| 2003/0180046 A1 * | 9/2003 | Veith | 398/54 |
| 2004/0136724 A1 | 7/2004 | Mansbridge | 398/161 |
| 2005/0163170 A1 * | 7/2005 | Okhotnikov et al. | 372/6 |

FOREIGN PATENT DOCUMENTS

WO     WO 01/80507 A2    10/2001

OTHER PUBLICATIONS

Khrushchev, I.Y. et al., "Multiwavelength Pulse Source for OTDM/WDM Applications Based on Arrayed Waveguide Grating", IEEE Photonics Technology Letters, IEEE Inc. New York, US, vol. 11, No. 12, (Dec. 1999), pp. 1659-1661, XP000926817, ISSN: 1041-1135.

* cited by examiner

ELECTRICALLY PROGRAMMABLE PULSE GENERATOR, IN PARTICULAR A PULSE GENERATOR OF VERY HIGH RESOLUTION PHASE AND INTENSITY PROFILES

CROSS REFERENCE TO RELATED APPLICATIONS or PRIORITY CLAIM

This application is a national phase of International Application No. PCT/FR2005/050662 entitled "Pulse Electrically Programmable Generator, In Particular A Phase Profiles And A Very High-Resolution Intensity Generator", which was filed on Aug. 9, 2005, which was not published in English, and which claims priority of the French Patent Application No. 04 51834 filed Aug. 10, 2004.

TECHNICAL AREA

The invention relates to an electrically programmable pulse generator, in particular a pulse generator of very high resolution phase and intensity profiles.

The object of the invention is to enable the generation of fully arbitrary, temporal pulse profiles associated with phase or intensity profiles having very high time resolution and strong dynamics. The sphere of resolutions accessible by the invention is very broad, and in particular enables pulses to be obtained whose durations lie between the picosecond (even less) and over 100 ns.

Figure 1:
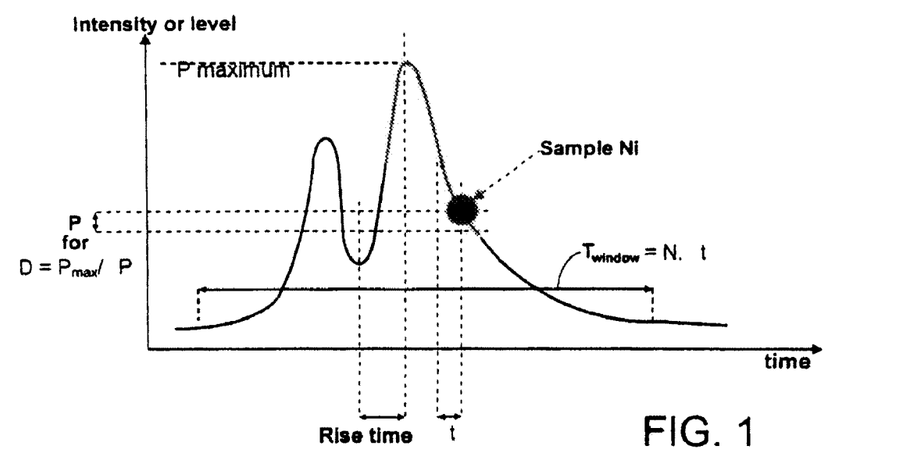
FIG. 1, a curve explaining a pulse, already described previously.

Whether the pulses are of electric, optical or other type, the generation of profiles of any form is generally possible within limits given and set by the technology. Time resolution ($\delta t$), which determines the smallest time interval on which the signal level ($\Delta P$) can be caused to vary by a certain quantity inside the pulse, forms the first of these limits. The inverse of $\Delta P$, which is generally desired to be a fraction as small as possible of the value of the peak signal (Pmax) in the pulse, determines the dynamics (D) of modulation. At all events, these dynamics are limited by the signal-to-noise ratio, the effects of non-linearity and the encoding of the signal variation $\Delta P$. The three basic magnitudes when quantifying the performance of a programmable shaping device (FIG. 1) are:
  dynamics $D=Pmax/\Delta P$ which it is always sought to maximize,
  time resolution $\delta t$ determining the time interval defined above, and which it is sought to optimize,
  the number of samples N inside a shaping window of duration $T_{window}=N.\delta t$, which it is sought to maximize.

The prior art, in the area of opto-electronic technologies for the shaping of optical and/or electric pulses, comprises various approaches in relation to the sphere of application concerned.

For example, the document "National Ignition Facility Front End Laser System", by S. C. Burkhart et al., Solid State Lasers for Application to Inertial Confinement Fusion Conference, proceedings p. 48, Monterey—Calif., 31 May-2 June 1995, describes a system in which two microwave lines with microstrips can be coupled together distributed fashion, in a series of elementary sections containing transistors of GaAs FET type, to generate an arbitrary, programmable pulse shape. The first of the two lines is the one used for distributing a short, intense electric pulse, and second is a combination (or summation) line of the electric samples produced in sequence. The substrate used for implanting the lines is a microwave substrate with low dielectric losses, and the lines are structured with spatially variable, characteristic impedance. Each of the transistors is pre-polarized using a direct voltage Vi, and has an equivalent resistance related to the value of the voltage Vi. The transfer of electric energy through a given transistor generates a voltage sample on the summation line, which is applied to the load of the second line at a given characteristic time in relation to the propagation rate on this line and the position of the transistor. The resolution $\delta t$ is defined by the smallest of the two time values which are the duration of the electric pulse on triggering, and the difference in propagation time on the two lines, between two successive coupling points. The summation over time of the voltage samples produced by each of the transistors generates a train of electric pulses entered into an envelope whose profile is adjusted on demand. One difficulty with this type of device is the need for very accurate calibrating of the entire electric structure, having regard to the fact that the intensity of a given sample is a function of all the N values of voltage Vi. This means that each sample cannot be defined independently of the others. A large number of points are possible with this principle, through the association of several electronic boards which must therefore be perfectly balanced with regard to propagation time and voltage levels. With this technology it is typically possible to obtain resolutions in the range $\delta t=150$ to 200 ps. But smaller $\delta t$ values are difficult to contemplate owing to the effects of electric dispersion on the microstrip lines, which are very limiting. The rise times are generally in the range 150 to 200 ps, and the performance of a system, based on N=300 samples equi-distributed on a pulse of duration 30 ns (in practice, effective $\delta t>200$ ps), was demonstrated over a range of electrical pulses whose peak voltage reaches 5 peak volts.

According to another technology described in the document <<Aperture Coupled Striplines>>, in Quarterly reports LLE Rochester (application on OMEGA), two microwave lines are coupled continuously via an adjustable aperture, with a spatially variable profile. The profile of the electrical pulses can then be modified over a relatively wide template range, but it does not have the extent of flexibility of the previous system. In particular, each of the points of the profile cannot be directly addressed and a reverse calculation is previously required, for each profile to be generated. On the other hand, performance in terms of rise time is slightly better than in the preceding technology, being around 100 ps for pulse durations of a few nanoseconds. As previously, the minimum value of $\delta t$ is limited by the technology of electronic or optoelectronic switches, and the maximum value of the product N×$\delta t$ is limited by phenomena of electric dispersion on the lines.

In the sphere of applications to pulse lasers, the principle of microwave lines arranged on a substrate with low losses and long length were originally applied to a simpler, non-programmable configuration. This very simple configuration consists of making use of the variation in amplitude of electric reflections on a fixed electric charge, at the input of a single line, a single line whose impedance has a spatially variable value. The impedance profile along this line must be adjusted when needed however, in relation to the profile of the electric pulse to be generated. This device is the simplest, but only functions for monotonic pulse profiles (monotonic growth or decrease in the absence of changes in slope signs). Also, it is not programmable and is relatively difficult to fabricate in the context of shape templates which have to be produced with great accuracy. The above-mentioned electronic and electro-optical limits, for minimal $\delta t$, remain applicable.

In the area of the lowest time resolutions, the manufacturers of electronic equipment propose generators of arbitrary shapes for a range of resolutions from $\delta t>1$ to a few nanoseconds. This is equipment with strong dynamics (D>a few $10^2$)

for which N can assume excessively high values, but is intrinsically incompatible with δt values in the picosecond range.

In the area of programmable generators of high voltage pulses of arbitrary shape, devices also with discrete lines or strips have been proposed. They provide access to a range of values from δt=100 to 200 ps in a range of $T_{window}$ values from a few nanoseconds to 10 ns, for electric pulses with a peak intensity of a few kilovolts. The principle of the use of photoconductors on strip lines is currently the only one that is compatible with high voltage pulses and in which N=a few dozen to 100 samples for pulse durations $T_{window}$ located in the 10 ns range. This type of system, while it offers strong dynamics (D>$10^3$), is incompatible however with δt<100 ps values in the sphere of pulses having a duration of more than 10 ns, the electronic and opto-electronic limits cited above also being applicable.

In the area of so-called <<all optical>> technologies (see for example the document by B. Colombeau et al., "Shaping of short laser pulses by passive optical Fourier techniques", in Opt. Comm. 19, p. 201, 1976), devices based on the use of frequency conversion and mixing make it possible to achieve optical pulse profiles in the δt<1 ps range. These devices provide access to high time resolutions, but they are essentially adapted to pulses of small width (typical window 1 ps-1 ns). They initially require a short pulse of determined spectral width, on which output performance is dependent. The product N×δt is relatively high, typically $10^3$<N<$10^4$ However, they require critical calibration operations to obtain an a priori specified profile and they are very complex to produce in terms of optical structure.

The invention concerns a system based on a simple, highly flexible concept which can be of interest for an extensive performance range. For the generation of fully arbitrary profiles, it has the major advantage of extremely simple programming with the use of a sequence of samples each independent of each other. According to the desired number of samples, the time resolution domain can cover δt values ranging from a few fractions of a picosecond (in the optical domain) to a few picoseconds (in the electrical domain), and up to several dozen nanoseconds, whilst maintaining simultaneously very high values for N and D. This concept is applicable to at least two possible configurations:

one, of electro-optical type, in the δt domain higher than a few picoseconds, is applicable to modulating functions of optical phase or intensity, and of electrical intensity. This configuration is fabricated in all-fibre form and is hence very compact and robust. From the user's viewpoint, the fact that no optical aligning operation is required also contributes towards highly simple implementation. The performance capacities of the system of the invention are of special interest, particularly in <<low voltage electro-optics>> and <<all optical>> areas.

the other, purely of optical type, in the area in which δt is greater than a few fractions of a picosecond, is applicable to the needs of optical intensity modulation. Compared with the system of electro-optical type, only the type of output modulator changes.

The invention allows a certain number of the above-mentioned shortcomings to be remedied with respect to other shaping devices, whilst providing access to a combination of output performance capabilities hitherto not reached in existing systems, namely:

a high time resolution (reduction of δt by a factor of 10 to 100 compared with known electro-optical devices) is combined with the possibility of functioning with a much higher number of samples (N=$10^4$ to $10^5$ is a minimum value, at all events not giving rise to any technical problem). Whether for the electro-optical option or the all-optical option, values of D higher than $10^3$ are perfectly feasible, a fully programmable nature, using standard, low frequency electronics (typically 100 MHz) and the use of commercially available, mass-distributed components impart a low-cost aspect to the invention with a maximum degree of flexibility and simplicity.

The invention therefore concerns a pulse generator of very high resolution phase and/or intensity profiles, comprising an optical source emitting a first optical pulse train as per a determined period (To). This generator also comprises:

a first modulator of the intensity of the optical pulses emitted by the source, and which emits at least a second train of intensity-modulated optical pulses, the different pulses being modulated independently of each other at determined intensity levels, an optical circuit having an optical length such that an optical pulse emitted by the source travels along it in a time (τ) slightly different to the period (To) of the source.

a first commendable, active optical coupler, having a first and second input and a first and second output. This coupler receives the second train of optical pulses on its second input. Its second output is coupled to the first input via an optical circuit of determined optical length, and it outputs on the first output a third pulse train containing as many pulses as the second pulse train, a command device to command the first optical coupler so that, according to a first command, it transmits the light received on its two inputs towards the second output and, according to a second command, it transmits the light received on its first input towards the first output.

Preferably, the optical source is an active mode-locking laser emitting a train of periodic pulses.

Advantageously, the first modulator is commanded by an aliased electric signal, the duration of each level of this signal being equal to the period (To) of the source.

According to one embodiment of the invention, the optical circuit has an optical length such that an optical pulse emitted by the source travels along it in a time (τ) slightly greater than the period (To) of the source.

Preferably, said optical circuit comprises a single mode optical fibre.

Provision may be made for the first modulator to have a modulation duration (NTo) that is a multiple of the source period. Also, provision may be made for the first command (K=0) to be triggered by the start of a modulation by the first modulator, and to be stopped at the end of this modulation, close to the pulse transit time between this first modulator and the second input of the first coupler. Provision may also be made for the second command (K=1) to be triggered when the first command is stopped.

Advantageously, an amplifier is inserted in the optical circuit.

A second optical coupler of which one input is connected to the first output of the first coupler, distributes the light on a first and second output. The light leaving this second output is transmitted to an optical detection circuit used to command said amplifier.

Advantageously, inserted in series in said optical circuit, a first Bragg grating may be provided used to compensate temporal dispersions.

According to one embodiment, the first output of the first coupler is coupled to a second optical modulator containing a resonant saturable absorbent or non-linear optical element (with Kerr effect for example), used to intensity-modulate a beam also incident on this second modulator.

According to another embodiment, the first output of the first coupler is coupled to an electro-optical converter which, in exchange for the received optical pulses, transmits electric pulses.

The electric pulses transmitted by the electro-optical converter are applied to an electro-optical modulator so as to modulate, in phase or intensity, a light beam incident on this electro-optical modulator.

Advantageously, a second Bragg grating is provided between the first output of the first coupler and the modulator or the electro-optical detector.

The different objects and characteristics of the invention will become more apparent from the following description and appended figures which show.

Figure 2:
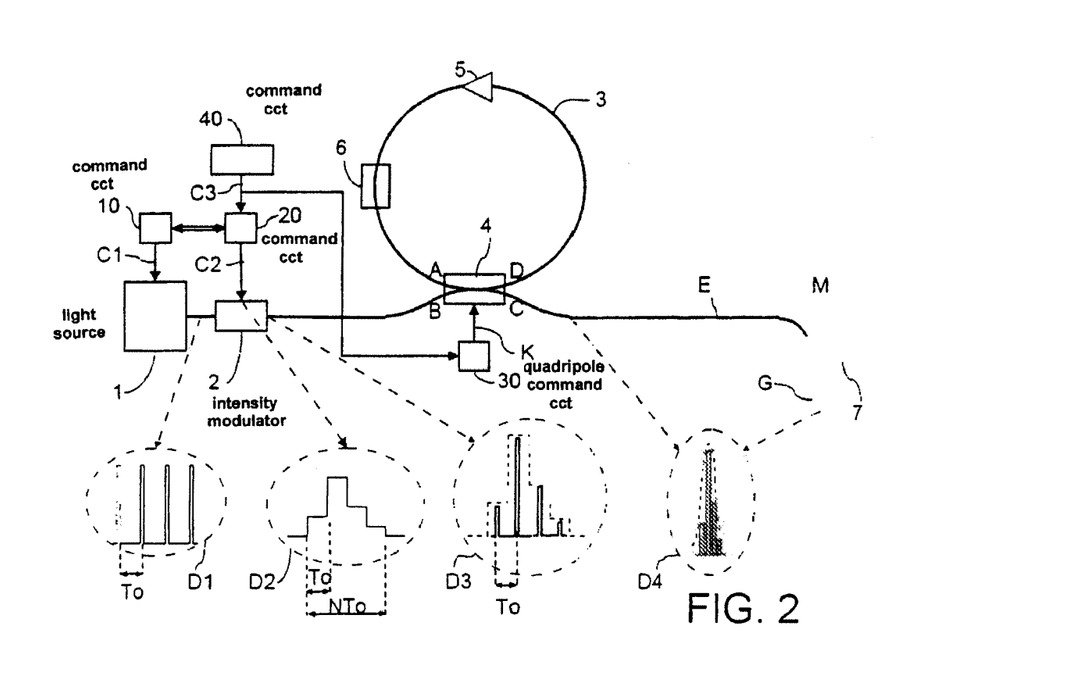
FIG. 2, a basic diagram of an example of embodiment of an all-optical generator according to the invention, FIG. 3, a chronogram illustrating the functioning of the pulse generator shown FIG. 2, FIG. 4, a diagram of an example of embodiment of an electro-optical generator derived from the generator in FIG. 2, FIG. 5, a more complete diagram of an example of embodiment of a generator according to the invention, FIG. 6, a variant of embodiment of the generator according to the invention.

With reference to FIG. 2, an example of a general embodiment of the generator of the invention will first be described.

This generator comprises a light source 1 which is for example an active mode-locking laser source which generates a continuous train of ultra-short optical pulses of period To=1/Fo, in a range of frequencies Fo=50-100 MHz, which is usual for this type of source. Activation and locking of the laser source are managed by a command circuit 10. Diagram D1 in FIG. 2 shows said pulse train.

These optical pulses are transmitted to an intensity modulator 2 which transmits the intensity-modulated light pulses to a loop of single mode optical fibre 3.

The modulator 2 modulates the optical intensity of the pulses it receives, pulse by pulse. For this purpose, it is driven by an electronic circuit 20 providing it with a command signal C2 having voltage pulses of variable amplitudes at the frequency of the mode-locking source 1. Command circuit 20 is therefore synchronized with command circuit 10 of the laser source. The diagram D2 in FIG. 2 shows said command signal, and diagram D3 shows a train of modulated pulses provided by the modulator 2. The modulator 2 and its command circuit 20 are conventional circuits.

The modulator is coupled to the optical fibre 3 by an optical coupler 4 with two inputs and two outputs.

The optical fibre loop 3 is connected between the output D and input A of the coupler. The modulator 2 is coupled by an optical fibre to input B of the coupler so that the light pulses emitted by modulator 2 can be transferred onto output D of the coupler. The functioning of this coupler will be described further on.

The optical fibre 3 loop has a characteristic optical time τ (or fibre optical length) which represents the time taken by a pulse to travel along the fibre loop. This loop is used in a particular functioning mode which associates the functions <<sample accumulator>> and <<time scale compressor>>. Its role is to multiply, by a very high factor, the initial emission frequency Fo of the pulses emitted by source 1 and intensity-modulated by the modulator 2. This process is made gradually "stacking" the light pulses one behind the other.

For this purpose, the invention provides for the characteristic time τ of the optical fibre loop 3 and the frequency Fo of the mode-locking source to be adapted to each other, in particular for time τ to be slightly different to period To of source 1 by a determined quantity. If τ is very slightly less than period To=1/Fo, a given pulse incident on input B of coupler 4 will come to position itself inside loop 3, by coupling onto output D of the coupler, just behind the pulse which entered therein during the preceding turn and which has already undergone the propagation delay related to this turn. Therefore, the time interval separating these two pulses is δt=To−τ, and the time interval To which separated two successive pulses delivered by modulator 2 has assumed the value δt. It is also possible to function <<modulo T0>>. For this principle to function, Fo and L must be perfectly stabilized throughout the accumulation of the pulses in the loop.

The initial filling rate of value δt×Fo, less than $10^4$, can be raised by around 50%, according to the shape of the elementary pulse associated with each sample. Let us consider an open time of given value $T_{open}$=N×To=N/Fo at modulator 2, the latter operating to extinction outside the time window of value T0, and a starting loop with no optical loss. It is possible to fabricate a train of pulses of duration $T_{window} \ll T_{open}$ and of very short periodicity δt with respect to 1/F0, by switching the loop after a certain time.

The smaller the drifts in frequency Fo of source 1 and in length L of the optical fibre loop 3 (respectively ΔFo and ΔL), and the shorter the duration (Δto) of the pulses provided by the mode-locking source, the more δt can be low and a high time resolution of the device can be obtained. For ΔL=O and ΔFo=0, it could even be possible for δt≈t0. The condition for optimum adjustment of our device is therefore described by the following equation:

$$Fo = 1/(\tau + \delta t)$$

A train of N short pulses accumulated in loop 3 is extracted from loop 3 under the command of a command signal K applied to coupler 4 by the electronic circuit 30. Diagram D4 in FIG. 2 shows a train of pulses delivered on output C of coupler 4.

This pulse train forms an equivalent composite pulse, whose envelope has the arbitrary shape defined by the series of voltage values of signal C2 applied to modulator 2. However, the duration of the envelope of the composite pulse in diagram D4 is much shorter than the duration of the pulse train in diagram D3.

According to this method, the profile of the composite pulse to be achieved is sampled at pitch δt (time resolution) and each of the samples of this profile is defined by a given value of the sequence of electric pulses applied to modulator 2. The N samples are defined independently of each other. All that is needed therefore is that the profile of the composite pulse should correspond to a pulse profile specified on demand in order to obtain a generator of arbitrary pulse profiles with very high time resolution, and electrically programmable.

Also, the system in FIG. 2 comprises an optical amplifier 5 inserted in series in the loop 3. The proper functioning of the system at high N values, supposes that the loop gain is near-unitary, and that there are no uncontrolled attenuation effects of the pulses inside the loop throughout duration N×To. The system in FIG. 2 assumes that the attenuation induced in the fibre loop is known a priori and is controlled over time, and that the amplifier 5 is able to have an adjustable net gain.

Provision may be made, as described with reference to FIG. 5, for an electronic servo device 50 for loop gain γ which, during an intermediate sequence not described here in detail but which is activated between two pulse trains extracted from the fibre loop, uses the <<sampling>> output signal of the coupler 8. The sampling value is typically a few percent. This device 50 generates an electrical command 51 enabling the servo-control of γ.

With servo control it is therefore possible to correct drifting of the system. This servo control can be implemented in identical manner in the layouts of FIGS. 2, 4, 5 and 6. The fibre amplifier shows a gain G of substantially G≈1/γ, and is input and output insulated. The adjustment of loop gain, should the technology of the amplifier require that the variations it can apply to G are only very slow variations, can also be achieved by acting on an additional coupling element (not shown in the figures). This element, of electro-optical type with losses able to be activated more rapidly, is placed inside the amplifier in series in its output, and is activated by electronic command 51.

Inserted in series in loop 3, provision is also made for a Bragg grating 6. This grating plays an important role in the system of the invention since it must minimize residual temporal dispersion on a loop turn, and thereby make it possible to maintain temporal fine-tuning of the pulses provided on input B of the coupler. It must be possible for the number N of pulses in a composite pulse, such as shown in diagram D4, to reach very high values, e.g. N=$10^4$. Under these conditions, a pulse entering loop 3 via input B must travel $10^4$ turns. The total propagation length of a pulse is therefore $L_{tot}$=N×L, L being the length of the loop. For example, with L=2 m and N=$10^4$, the total travelled length will be $L_{tot}$=20 Km. If this grating were not present, the resolution δt would deteriorate progressively during the sample accumulation process, and a compromise would have to be found in relation to δt maximum and N. The compensation effect is used on each loop turn, as is the gain brought by the amplifier 5. The grating is preferably chirped and is optimized in relation to all the parameters of the <<loop and amplifier>> assembly.

A description is now given of the commanding of coupler 4, allowing the extraction of pulse trains from loop 3. The coupler 4 is an active component which can be switched electrically (but switching via optical command is evidently also possible).

The quadripole is therefore an electro-optical directional coupler with waveguides, similar to those used for rapid multiplexing functions in telecommunications networks, such as the DWDM network described in the document <<DWDM, Networks, Devices and Technology>> by Kartalopoulos, Ed. Wiley-Interscience, 2003 p. 125-126. This type of coupler is based on the principle of controlling the interaction between waveguides coupled longitudinally by evanescent wave. The switching times of the directional electro-optical couplers being precisely situated in the subnanosecond range, making them fully suitable for their application to the invention. These couplers also have the advantages of very high insulation between adjacent ports, high spectral acceptance, and a low noise factor.

Coupler 4 is therefore of quadripole type having two inputs A, B and 2 outputs C, D. The quadripole is driven by a command signal K delivered by an electronic circuit 30 so that:
for K=0, the optical signals incident on the 2 inputs A and B are transmitted on output D towards the fibre loop 3,
for K=1, input A is coupled to output C and transfer from input A to output D is inhibited; the light pulses which have entered loop 3 are extracted towards output C of the coupler.

Figure 3:
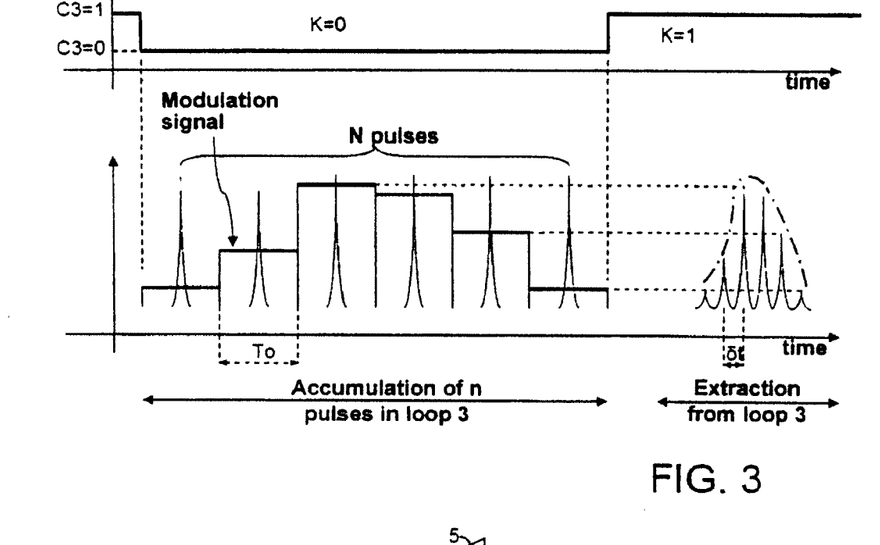

A central command circuit 40 as shown FIG. 3, emits a command signal C3=0 which commands the functioning of circuit 20 which sends a modulation signal C2 to modulator 2 (see FIG. 3). The modulation signal C2 allows the modulation of the different pulses arriving from source 1. In parallel, signal C3=0 commands circuit 30 which sends a signal K=0 to coupler 4, which couples input B of the coupler to its output D and also couples input A to output D. The modulated pulses are inserted in loop 3.

When the command circuit 40 sends a signal C3=1, command circuit 20 commands stopping of modulation in modulator 2 and circuit 30 outputs a signal K=1 to the coupler which couples input A of the coupler to output C. The pulses which were inserted in loop 3 are extracted therefrom by output C of the coupler in the form of a train of pulses very close to each other, as shown on the right side of the chronogram in FIG. 3.

This pulse train is applied to an optical modulator 7 which, receiving an optical beam M to be modulated M, delivers a modulated optical beam G. Modulator 7 is for example a semiconductor saturable absorbent device, in particular a quantum well resonant device for example. This device may also, if contrast is limited at absorption saturation, be of differential type.

Under the operating principle of optical modulators with saturable absorbent (or with other non-linear optical element), the beam emitted by fibre E and the beam M to be modulated are not incident co-linear fashion on the input face of device 7. The angle of offset may typically lie between 10 and 45 degrees. The transmission rate of the saturable absorbent is modulated in relation to the intensity delivered by fibre E. The overall calibration of the device must take into account the form of the transfer characteristic of the absorbent.

Figure 5:
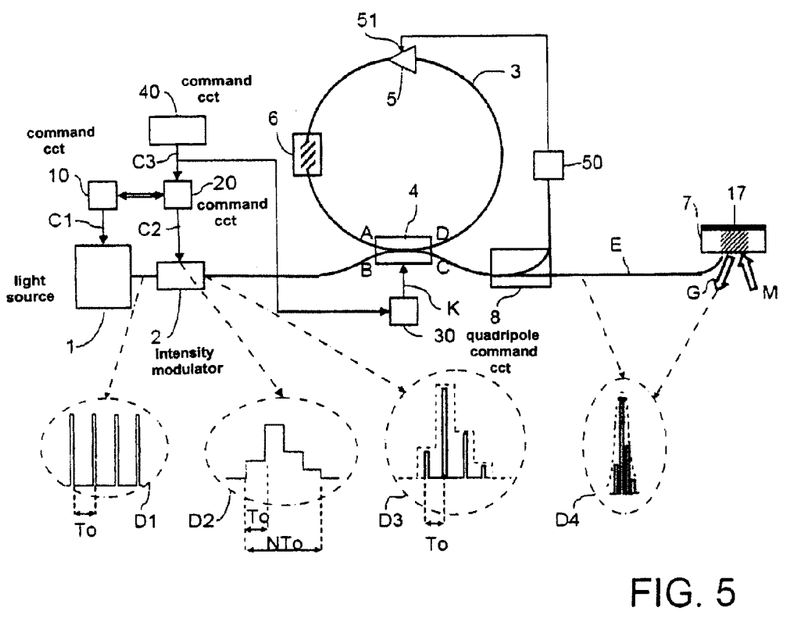

According to one variant of embodiment shown FIG. 5, device 7 can operate by reflection. In this case, the face opposite the incident face of the beam from fibre E and of beam M, is reflective. For example it comprises a reflective layer 17. The functioning of this reflective configuration is similar to the configuration functioning by transmission, and with twofold efficacy since it passes twice through the thickness of the absorbent.

Modulation is made by action on the transmission of the saturable absorbent of modulator 7. In this case, the peak intensity in the pulse which illuminates the absorbent is adjusted in relation to the transfer characteristic of the absorbent. Adjusting this peak intensity to the value corresponding to total whitening of the absorbent, makes it possible to minimize the decrease in dynamics due to the non-linear optical transfer function.

Figure 4:
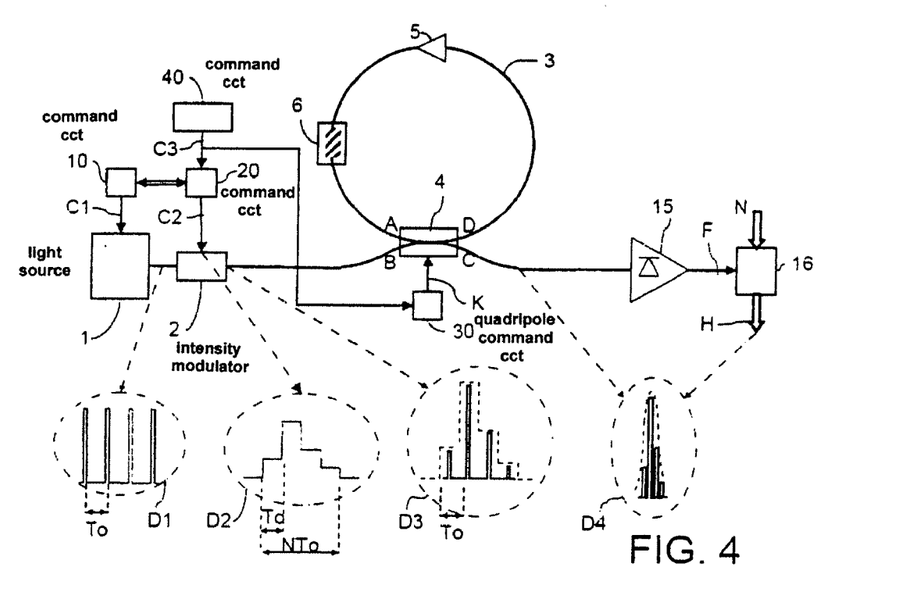

FIG. 4 shows a variant of embodiment in which the output C of the coupler is connected by optical fibre to an ultra-fast converter 15 which, in exchange for a train of optical pulses which it receives, outputs at F a train of electric pulses. This electric signal is applied to an electro-optical modulator 16 used to modulate a beam N to give a beam H that is amplitude (intensity)-modulated or phase-modulated. The electro-optical modulator 16 may be a Pockels-effect device, which converts an electric field into an index variation of the material. Over a given length, this material gives phase modulation. By inserting this device in a Mach Zehnder interferometer, an optical intensity modulator is obtained.

FIG. 5 shows a more complete example of embodiment of the pulse generator of the invention. This system has servo-control of amplifier 5 in relation to a signal detected on output C of the coupler.

A coupler 8 is connected to output C of coupler 4, able to sample a small part (a few percent for example) of the signal leaving the coupler via output C. Maintaining unitary gain in the presence of optical losses (propagation on the fibre and coupler 4) which additionally may drift over time, requires electronic servo-control of gain G of amplifier 5 using a sample taken on the signal emitted at output C. The sample optical signal is transmitted to the servo-control electronics 50 which, in exchange, outputs an electric signal 51 used to command the amplifier 5.

Therefore, near-unitary loop gain is maintained on a very high number of loop turns within the limits related to saturation of the amplifier. For low losses, which is the case in single mode fibres, the value of G is low (less than 10 dB). The amplifier can be produced using conventional low-cost technology with a low noise factor (typically 4 to 5 dB with current technologies).

The ultimate limits in terms of intensity dynamics (D) are defined by this same noise factor, the opto-electronical noise derived from the mode-locking source, the amplitude dynamics accessible with the modulator 2 ($10^4$ to $10^5$ is a conventional value in the range of frequencies Fo) and, with respect to electric pulses, the contribution of the fast output optical-electric converter.

Two characteristics of interest from a user viewpoint are to be pointed out, to justify the simplicity of use:
- the N successive samples are defined independently of each other, in sequence,
- the programming of the N values is made linear fashion, intrinsically. No correction of non-linearity is necessary for as long as the loop amplifier does not saturate.

The production of electric pulses is made using simple optical-electrical conversion behind an amplified photodiode with wide bandwidth. The usual bands currently used are the following: DC at 10-40-60 GHz.

Figure 6:
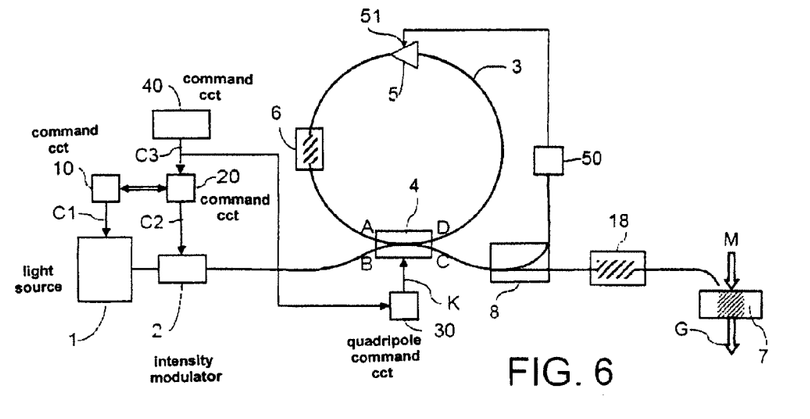

FIG. 6 shows a variant of embodiment of the generator of the invention enabling direct modulation of optical intensity, at the wavelength of the mode-locking source. A second Bragg grating 18 is inserted between points C and E to induce optical dispersion in order to obtain suitable smoothing of the shaped pulse. The residual ripple rate on the envelope is then reduced to the required level. Optimizing the pulse profile shaping performance raises the very general problem of defining the ripple rate around the envelope, a phenomenon inherent in the sampling principle. The smoothing to be obtained must be defined in the window of duration N×δt. The range of currently accessible values is: δt=a few fractions of ps, typically N=$10^4$ to $10^5$ and D>$10^3$.

In the system shown FIG. 4 concerning an electro-optical system and allowing indirect modulation of electric intensity at the output of the ultra-rapid modulator 16, at point F, the limited pulse response of the modulator naturally produces a time smoothing function, and the second Bragg grating is not mandatory.

At point H there is indirect modulation of optical phase, at the wavelength of an external optical beam, via an electro-optical phase modulator 16. This modulator 16 can be an ultra-fast component derived from developments in telecommunications, in the 40-100 GHz band. The range of currently accessible values is: δt≈3 ps, typically N>$10^5$ and D>$10^2$.

Also, provision may be made to "smooth" the composite pulse obtained. This is smoothed around the envelope, programmed using specified values V(t) at the input of modulator 1 by time filtering. The role of smoothing is to reduce the amplitude of the resulting output modulations, without deteriorating too extensively the rise and fall times of the envelope. Filtering can be made:
- intrinsically, at the optical pulse level,
- by adjusting dispersion effects produced by the Bragg grating in the fibre loop,
- or by electronic filtering when an electric pulse is generated.

In the above description, consideration was essentially given to the generation of optical pulses, but the generator of the invention is also applicable to the generation of electric pulses by sampling pulses, at point F for example in FIG. 4.

The invention is applicable to all areas which may require temporal pulse shaping. The pulses may indifferently have low or relatively high repetition rates. The maximum admissible limit of repetition rate in our device being given by Fo.δt and the saturation limit of the amplifier gain, the means available for increasing this rate include:
- reducing To with a mode-locking source of greater frequency. This is fully possible since numerous studies are currently in progress for the development of this type of source with Fo=1 to 10 GHz.
- reducing L by replacing the fibre amplifier by an amplifier with waveguide on semiconductor, of much shorter optical length.

The pulses to be shaped may be of optical or electrical type.

For application of the invention to the area of high voltages, it may be considered:
- either to couple the output of the converter directly to a cascade of amplifiers, for which current technology is limiting within a range of analog frequencies of 0 to a few GHz,
- or optically to amplify the pulse train delivered at output C, in a configuration to be determined using existing laser technologies, then using the envelope so amplified for switching a photoconductor polarized under a direct high voltage.

Numerous other fields of applications can also be contemplated, inter alia in the field of lasers. One example, for which the invention is of fundamental interest, is the PW class of lasers for high energy physics. In this area, the providing of maximum peak power is directly determined by the capability of the installation's pilot to pre-compensate the defects of temporal lengthening devices at the head of the chain, and defects of power amplification. The possible recompression in minimum time of all the energy amplified in a PW chain can be easily assessed and applied with the invention, having regard to the simultaneous needs of:
- very strong time resolution, in the range of 1 to 10 ps,
- a very high number of points in the range $T_{window}$=5 to 10 ns,
- maximum flexibility and possible computer programming of profiles.

The invention claimed is:

1. Pulse generator of very high resolution phase and/or intensity profiles, comprising an optical source configured to emit a first train of optical pulses according to a determined period (To), characterized in that it also includes:
- a first modulator modulating the intensity of the optical pulses emitted by the source, and emitting at least a second train of intensity-modulated optical pulses, the different pulses being modulated independently of each other at determined intensity levels,
- an optical circuit having an optical length such that an optical pulse emitted by the source travels along it in a time (τ) slightly different to the period (To) of the source, a first, active, commandable optical coupler having a first and second input and a first and second output, this coupler configured to receive said second train of optical pulses on its second input, having its second output coupled to the first input via an optical circuit of determined optical length, and configured to deliver on the first output a third pulse train containing as many pulses as contained in the second pulse train, a command device configured to allow commanding of the first optical coupler so that, according to a first command (K=0), it transmits the light received on its two inputs towards the second output and, according to a second command (K=1), it transmits the light received on its first input towards the first output.

2. Pulse generator according to claim 1, characterized in that the optical source is an active mode-locking laser emitting a train of periodic pulses.

3. Pulse generator according to claim 1, characterized in that the first modulator is commanded by a modulating electric signal, the duration of each level of this signal being equal to the period (To) of the source.

4. Pulse generator according to claim 1, characterized in that the optical circuit has an optical length such that an optical pulse emitted by the source travels along it in a time ($\tau$) slightly longer than the period (To) of the source.

5. Pulse generator according to claim 1, characterized in that said optical circuit comprises a single-mode optical fibre.

6. Pulse generator according to claim 5, characterized in that it comprises an amplifier inserted in the optical circuit.

7. Pulse generator according to claim 5, characterized in that the optical circuit comprises a first Bragg grating, inserted in series, to achieve compensation of temporal dispersions.

8. Pulse generator according to claim 7, characterized in that it comprises a second Bragg grating positioned between the first output of the first coupler and the modulator or electro-optical detector.

9. Pulse generator as in claim 1, characterized in that the first modulator has a duration of modulation (NTo) that is a multiple of the period of the source, in that the first command (K=0) is triggered by the start of a modulation by the first modulator and is stopped at the end of this modulation, close to the pulse transit time between this first modulator and the second input of the first coupler, and in that the second command (K=1) is triggered when the first command is stopped.

10. Pulse generator according to claim 1, characterized in that it comprises a second optical coupler of which one input is connected to the first output of the first coupler, and configured to distribute the light on a first and second output, the light extracted on the second output being transmitted to an optical detection circuit which enables commanding of said amplifier.

11. Pulse generator according to claim 1, characterized in that the first output of the first coupler is coupled to a second modulator with resonant saturable absorbent, or with a nonlinear optical element allowing modulation of a beam also incident on this second modulator.

12. Pulse generator according to claim 1, characterized in that the first output of the first coupler is coupled to an electro-optical converter which, in exchange for received optical pulses, transmits electric pulses.

13. Pulse generator according to claim 12, characterized in that the electric pulses transmitted by the electro-optical converter are applied to an electro-optical modulator, thereby making it possible to modulate, in phase or intensity, a light beam incident on this electro-optical modulator.

\* \* \* \* \*